United States Patent [19]

Bikson et al.

[11] Patent Number: 5,364,454
[45] Date of Patent: Nov. 15, 1994

[54] FLUID SEPARATION COMPOSITE MEMBRANES PREPARED FROM SULFONATED AROMATIC POLYMERS IN LITHIUM SALT FORM

[75] Inventors: Benjamin Bikson, Brookline; Joyce K. Nelson, Lexington, both of Mass.

[73] Assignee: Praxair Technology, Inc., Danbury, Conn.

[21] Appl. No.: 83,598

[22] Filed: Jun. 30, 1993

[51] Int. Cl.$^5$ .................. B01D 53/22; B01D 69/12
[52] U.S. Cl. .......................................... 95/45; 95/52; 95/54; 96/8; 96/13
[58] Field of Search .................. 95/45, 51–55; 96/8, 10–14

[56] References Cited

U.S. PATENT DOCUMENTS

| | | | |
|---|---|---|---|
| 3,219,698 | 11/1965 | Halpern et al. | 260/576.6 |
| 3,259,592 | 7/1966 | Fox et al. | 260/2.2 |
| 3,306,874 | 2/1967 | Hay | 260/47 |
| 3,306,875 | 2/1967 | Hay | 260/47 |
| 3,350,844 | 11/1967 | Robb | 55/16 |
| 3,510,387 | 5/1970 | Robb | 161/112 |
| 3,551,244 | 12/1970 | Forester et al. | 156/246 |
| 3,631,130 | 12/1971 | Klebe | 260/0.2 |
| 3,677,976 | 7/1972 | Miller et al. | 260/2 |
| 3,709,841 | 10/1972 | Quentin | 210/23 |
| 3,733,307 | 5/1973 | Cooper | 260/61 |
| 3,735,559 | 5/1973 | Salemme | 55/16 |
| 3,780,496 | 12/1973 | Wald, III et al. | 55/16 |
| 3,855,122 | 12/1974 | Bourganel | 210/23 |
| 3,875,096 | 4/1975 | Graefe et al. | 260/29.2 |
| 3,980,456 | 9/1976 | Browall | 55/158 |
| 4,035,337 | 7/1977 | Cooper et al. | 260/47 |
| 4,073,724 | 12/1976 | Chapurlat | 210/23 H |
| 4,155,793 | 5/1979 | Salemme et al. | 156/246 |
| 4,192,842 | 3/1980 | Kimura et al. | 264/298 |
| 4,467,001 | 8/1984 | Coplan et al. | 427/434.6 |
| 4,468,501 | 8/1984 | Zampini et al. | 55/158 |
| 4,468,502 | 8/1984 | Malon et al. | 55/158 |
| 4,602,922 | 7/1986 | Cabasso et al. | 55/158 |
| 4,626,585 | 12/1986 | Bartmann et al. | 528/212 |
| 4,636,314 | 1/1987 | Beuhler et al. | 96/4 X |
| 4,650,501 | 3/1987 | Hiscock et al. | 55/26 |
| 4,673,717 | 6/1987 | Percec et al. | 525/390 |
| 4,686,131 | 8/1987 | Sugio et al. | 55/158 |
| 4,717,395 | 11/1988 | Chiad | 55/16 |
| 4,718,921 | 1/1988 | Makino et al. | 96/8 X |
| 4,767,422 | 8/1988 | Bikson et al. | 55/16 |
| 4,818,387 | 4/1989 | Ikeda et al. | 55/158 |
| 4,866,099 | 9/1989 | Hendy | 210/650 |
| 4,880,440 | 11/1989 | Perrin | 55/16 |
| 4,909,810 | 3/1990 | Nakao et al. | 55/16 |
| 4,920,193 | 4/1990 | Han et al. | 528/171 |
| 4,950,314 | 8/1990 | Yamada et al. | 55/158 |
| 4,954,143 | 9/1990 | Scott et al. | 55/16 |
| 4,971,695 | 11/1990 | Mi et al. | 55/158 |
| 4,981,498 | 11/1991 | Bikson et al. | 55/16 |
| 4,990,165 | 2/1991 | Bikson et al. | 55/158 |
| 5,002,590 | 3/1991 | Friesen et al. | 55/16 |
| 5,009,678 | 4/1991 | Bikson et al. | 55/16 |
| 5,026,479 | 6/1991 | Bikson et al. | 210/321.8 |
| 5,062,866 | 11/1991 | Ho | 96/4 X |
| 5,160,511 | 11/1992 | Lovelock | 96/8 X |
| 5,169,416 | 12/1992 | Pedretti et al. | 96/14 |

FOREIGN PATENT DOCUMENTS

| | | | |
|---|---|---|---|
| 263672 | 8/1989 | Czechoslovakia | D01F 6/66 |
| 0181850 | 5/1986 | European Pat. Off. | B01D 13/04 |
| 0277834 | 8/1988 | European Pat. Off. | B01D 13/04 |
| 0298531 | 1/1989 | European Pat. Off. | B01D 13/04 |
| 0394505 | 10/1990 | European Pat. Off. | B01D 69/00 |
| 0404416 | 12/1990 | European Pat. Off. | B01D 69/14 |
| 58-037024 | 3/1983 | Japan | 96/13 |
| 100917 | 5/1988 | Japan | B01D 53/22 |
| 137703 | 6/1988 | Japan | B01D 13/00 |
| 264102 | 11/1988 | Japan | B01D 13/00 |
| 305904 | 12/1988 | Japan | B01D 13/04 |
| 1-199625 | 8/1989 | Japan | 96/12 |

OTHER PUBLICATIONS

Journal of Membrane Science, vol. 64, "Formation of Asymmetric Hollow Fiber Membranes for Gas Separation", by Smid et al., pp. 121–127, 1991.

(List continued on next page.)

Primary Examiner—Robert Spitzer
Attorney, Agent, or Firm—Chung K. Pak

[57] ABSTRACT

The present invention relates to fluid separation composite membranes prepared from sulfonated aromatic polymers in lithium salt form with sulfonic acid groups attached to aromatic rings that are incorporated into the main polymeric backbone.

14 Claims, No Drawings

OTHER PUBLICATIONS

Chemical Abstract No. 236575Y, vol. 112, No. 14, "Hollow Poly(Phenylene Oxide) Fibers and Process for Manufacturing Them", by Pechocova et al., p. 7, 1990.

Ind. Eng. Chem. Res., vol. 28, No. 6, 1989, "Analysis and Construction of Multilayer Composite Membranes to the Separation of Gas Mixture", by Kevin A. Lundy et al., (Reprinted from ISEC Research 1989, 28, 742).

Journal of Applied Polymer Science, vol. 20, (1976), "Sulfonated Polysulfone", by A. Noshay et al., pp. 1885–1903.

George Odian, "Principles of Polymerization", 2nd Edition, A. Wiley–Interscience Publication, John Wiley & Sons, pp. 22–23.

Journal of Applied Polymer Science, vol. 29, p. 4029, 1984.

"Research and Development of NS-1 and Related Polysulfone Hollow Fibers for Reverse Osmosis Desalination of Sea Water", PB 248,666; the Office Water Research and Technology Contract No. 14–30–3165, U.S. Dept. of the Interior, 1975.

"Research on Advanced Membranes for Reverse Osmosis", an annual report to the Office of Saline Water, U.S. Dept. of the Interior, Contract No. 14–30–2999, 1973.

Research and Development Progress Report No. 697, Contract No. 14–30–2627 to the U.S. Dept. of Interior, "Development of Polyphenylene Oxide Membranes", by Chludzinski et al., Jun. 1971.

Psaiination vol. 36, (1981), "Asymetric Reverse Osmosis and Ultrafiltration Membranes Prepared from Sulfonated Poly Sulfone", by Friedrich et al., pp. 39–62.

Journal of Applied Polymer Science, vol. 23, pp. 1509–1503, 1979.

"Research on In Situ–Formed Condensation Polymer for Reverse Osmosis Membranes", Final Report to the Office of Water Research and Technology, U.S. Dept. of the Interior, Contract No. 14–34–001–6521, 1978.

"Development of a Composite Reverse Osmosis Membrane for Single Pass Sea Water Desalination", Final Report to the Office of Water Research Technology, U.S. Dept. of the Interior, Contract No. 14–3-4–0001.7541, 1979.

FLUID SEPARATION COMPOSITE MEMBRANES PREPARED FROM SULFONATED AROMATIC POLYMERS IN LITHIUM SALT FORM

FIELD OF THE INVENTION

The present invention relates to fluid separation composite membranes prepared from sulfonated aromatic polymers in lithium salt form with sulfonic acid groups attached to aromatic rings that are incorporated into the main polymeric backbone.

BACKGROUND OF THE INVENTION

Permeable or semipermeable membranes are known to be used in a variety of fluid separations including reverse osmosis and gas separations. These membranes can offer, inter alia, significant cost savings over other fluid separation means, such as adsorption and distillation means. The effectiveness of the membranes in fluid separation, however, is highly dependent on the permeability and selectivity of the membranes, which, in turn, are often dependent on membrane forming materials.

Sulfonated aromatic polymers are known in the art as materials useful in the preparation of fluid separation membranes. Among sulfonated aromatic polymers, those that can be used advantageously to prepare fluid separation membranes, including gas separation membranes, are sulfonated polysulfones, sulfonated poly(-phenylene oxides), sulfonated polyetherketones, sulfonated polyamides and sulfonated polyureas to name a few. Examples of preparation of sulfonated aromatic polymer-based membranes can be found in U.S. Pat. Nos. 4,971,695; 4,954,143; 4,866,099; 4,717,395; 3,780,496; 3,735,559; 3,709,841, and European Patent Application publication 0394505.

Preparation of asymmetric and composite membranes from sulfonated aromatic polymers is described extensively in the art. For example, preparation of asymmetric polysulfone membranes is described in U.S. Pat. No. 3,855,122, and by Graefe et al. in "Research on Advanced Membranes for Reverse Osmosis," an annual report to the Office of Saline Water, Department of the Interior, Contract No. 14-30-2999, 1973. Preparation of composite sulfonated polysulfone membranes is described in U.S. Pat. Nos. 5,009,678 and 4,981,498, and by J. E. Cadotte et al. in "Research on In Situ-Formed Condensation Polymer for Reverse Osmosis Membranes," Final Report, Office of Water Research and Technology, U.S. Department of the Interior, Contract No. 14-34-001-6521, 1978. Preparation of composite sulfonated poly(phenylene oxide) membranes is described by A. F. Graefe in "Development of a Composite Reverse Osmosis Membrane for Single Pass Seawater Desalination," Final Report to the Office of Water Research and Technology, Contract No. 14-34-0001-7541, 1979, and by R. Huang and J. Kim in the Journal of Applied Polymer Science, Volume 29, page 4029, 1984.

The composite membranes are frequently prepared from an acid form of the respective sulfonated aromatic polymer due to the improved solubility of acid form in solvents convenient in the preparation of composite membranes, in particular, alcohols. However, the use of salt forms of sulfonated aromatic polymers is frequently preferred due to the improved stability of salt forms, as described in U.S. Pat. Nos. 3,875,096 and 3,780,496.

Typically, the composite membranes comprised of sulfonated aromatic polymer are prepared by dissolving the sulfonated aromatic polymer in acid form in a solvent to form a coating solution and then applying the coating solution to the surface of a porous substrate. The acid form of the sulfonated aromatic polymer is utilized to form the coating solution because of its advantageous solubility characteristics and its ability to prepare composite membranes from inexpensive common solvents, such as alcohols and their mixtures with water. After coating, the acid form of the sulfonated aromatic polymer is usually converted to the stable salt form by exchanging with a salt to reduce degradation of the resulting composite membranes during fluid separations. This exchange step not only represents an additional manufacturing step, but also can cause defects in composite gas separation membranes. The defects can be formed during the exchange step as a result of excessive swelling of the separation layer and are particularly deleterious to gas separation membrane performance.

There have been attempts to prepare composite membranes by coating a porous substrate directly with salified sulfonated aromatic polymers. The use of salt forms of sulfonated aromatic polymers to form composite membranes is described in U.S. Pat. 4,818,387 and in European Patent Applications having publication numbers 0277834 and 0404416. However, these membranes were formed from aggressive and/or toxic solvents, such as methoxyethanol and formic acid. To improve membrane permeation rates of composite membranes in reverse osmosis and ultrafiltration applications, additives are frequently included into coating formulations. Typical additives include polyhydric alcohols, such as glycerine; salts, such as lithium chloride; or organic acids, such as citric or lactic acid.

The composite membranes of prior art produced from salt forms of sulfonated aromatic polymers are frequently prone to defects and/or exhibit reduced permeation rates, in particular, as composite gas separation membranes. These low permeation rates result from the use of strong solvent systems required to dissolve the salt forms of sulfonated aromatic polymers. Strong solvent systems will frequently adversely affect the porous support structure, in particular, the polysulfone support structure which is frequently preferred in the preparation of composite membranes.

Therefore, there is a genuine need in the art for composite membranes having enhanced permeation and separation characteristics, which are not prone to defects and/or which does not exhibit reduced permeation rate during liquid or gas separation.

SUMMARY OF THE INVENTION

According to the present invention, this genuine need is met by preparing composite membranes from coating solutions of aromatic polymers in lithium salt form. To prepare composite membranes of this invention, porous substrates are coated with a coating solution containing the sulfonated aromatic polymer in lithium salt form. Following the coating step, the solvents are removed by evaporation. Alternatively, the coating/casting solution can be applied to the porous substrate followed by partial evaporation and coagulation in a nonsolvent system to form a substantially solidified composite membrane. The sulfonated polymers used are sulfonated aromatic polymers with sulfonic acid groups attached to aromatic rings which are part of the polymeric backbone. These sulfonated polymers include, among other things, sulfonated poly(phenylene oxide), sulfonated polysulfones, sulfonated polyether sulfone, sulfonated polyetherether sulfone, sulfonated polyetherketones, sulfonated polyimides, sulfonated polyamides, sulfonated polyureas, sulfonated polybenzimidazols and sulfonated poly(phenylene sulfides).

The sulfonated aromatic polymers in lithium salt form can be prepared by any method known in the art. For example, the acid form of the sulfonated aromatic polymer can be neutralized with lithium hydroxide. Alternatively, H+ or non-lithium salt forms can be ion exchanged with soluble lithium salts such as LiCl, LiNO3, and lithium acetate. The sulfonated aromatic polymers in lithium salt form can be further purified to remove impurities and/or byproducts by washing or dialysis prior to use.

As used herein, the term "aromatic polymer" means that more than 50% of the atoms in the main chain are members of aromatic rings.

As used herein, the term "aromatic rings that are part of the polymeric backbone" means that the aromatic rings are connected to other groups or atoms in the polymeric backbone by at least two covalent bonds.

As used herein, the term "sulfonated aromatic polymer in lithium salt form" means that at least 25 percent of the sulfonic acid groups contain lithium ion as a counterion, preferably more than 50 percent of sulfonic acid groups contain lithium ion as a counter ion, most preferably more than 75 percent of sulfonic acid groups contain lithium ion as a counterion.

DETAILED DESCRIPTION OF THE INVENTION

The present invention lies in the discovery that Li+ form of sulfonated aromatic polymers with sulfonic groups attached to aromatic rings which are part of the polymeric backbone are soluble in solvents most useful in the preparation of composite fluid separation membranes and produce membranes of improved integrity and improved separation characteristics.

The sulfonated aromatic polymers in lithium salt form particularly useful in preparation of composite membranes are sulfonated poly(phenylene oxide) polymers, sulfonated polysulfones, sulfonated polyether ketones, sulfonated polyimides, sulfonated polyamides, sulfonated polyureas, sulfonated poly(phenylene sulfides) and sulfonated polybenzimidazoles.

Of sulfonated poly(phenylene oxides), the sulfonated 2,6-dimethyl-1,4-phenylene ether polymer comprised of the following recurring units:

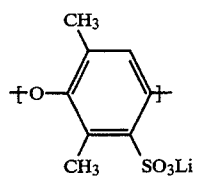

is found to be particularly useful in preparation of composite membranes. Preferably at least 18 percent of aromatic rings contain sulfonic acid groups.

Of sulfonated polysulfones, sulfonated bisphenol-A polysulfone, sulfonated hexafluoro bisphenol-A based polysulfone, sulfonated tetra methyl bisphenol-A based polysulfone, sulfonated polyarylether sulfone, sulfonated biphenylether-based polysulfone, and sulfonated polyaryletherether sulfone are found to be particularly useful in the preparation of composite membranes. The sulfonated bisphenol-A based polysulfone is defined as having the following recurring units:

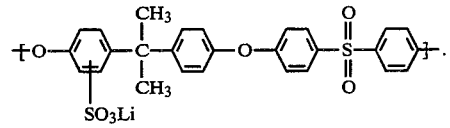

The sulfonated hexafluoro bisphenol-A based polysulfone is defined as having the following recurring units:

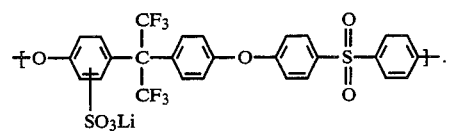

The sulfonated polyarylether sulfone is defined as having the following recurring units:

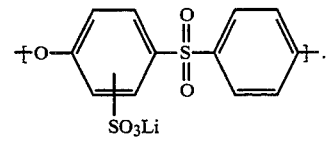

The sulfonated biphenylether-based polysulfone is defined as having the following recurring units:

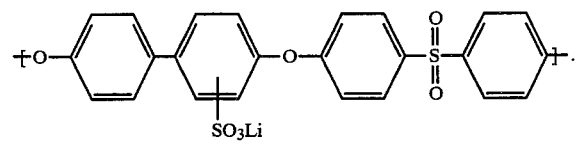

P The sulfonated polyaryletherether sulfone is defined as having the following recurring units:

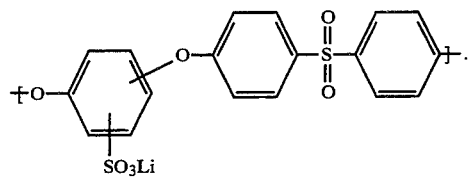

Preferably, at least about 15 percent of the aromatic rings of the above sulfonated polysulfone contain sulfonic acid groups.

Of sulfonated polyetherketones, the sulfonated poly(etheretherketone) defined as having the following recurring units:

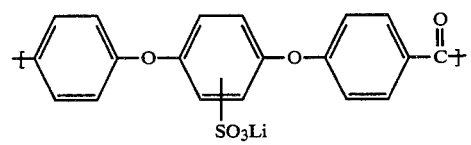

is found to be particularly useful in the preparation of composite membranes. At least 10 percent of its aromatic rings contain sulfonic acid groups.

Desirably, the weight average molecular weight of sulfonated aromatic polymers in lithium salt forms employed is above 20,000, most preferably above 30,000. Polymers with high molecular weight are preferred to insure good film-forming characteristics and formation of defect-free composite membranes.

The solubility characteristics of the $Li^+$ form of the sulfonated aromatic polymers allow for preparation of composite membranes with enhanced selectivity and permeability. Since coating solutions containing the dissolved $Li^+$ form of the sulfonated aromatic polymers can be directly applied on porous substrates to form composite membranes from simple solvent systems, such as alcohols, no subsequent ion exchange step to replace $H^+$ with a stable ionic form is required.

The sulfonated aromatic polymers of this invention can be prepared from precursor aromatic polymers by any known sulfonation method. For example, the precursor polymer is dissolved in an inert solvent, such as chlorinated hydrocarbon, and sulfonated with chlorosulfonic acid. Other sulfonation agents, such as sulfur dioxide and its complexes, can be utilized effectively as well. The sulfonation procedures are described in U.S. Pat. Nos. 3,709,841 and 4,054,707 and in the Journal of Applied Polymer Science, Volume 20, pages 1885–1903 (1976). Preferably, the sulfonated aromatic polymers may be prepared by substantially homogeneous process. The homogeneous process generally involves dissolving precursor aromatic polymers in an inert solvent; adding and mixing a sulfonation agent at a temperature sufficiently low to avoid any significant sulfonation reaction; and raising the temperature of the resulting mixture to cause sulfonation of the precursor aromatic polymer. It is understood, however, that the sulfonated aromatic polymers of the present invention may optionally be prepared from sulfonated aromatic monomers by polymerization or polycondensation procedures. The resulting sulfonated polymers above may have ion exchange capacities from about 1 meq/g to about 4 meq/g.

The resulting sulfonated aromatic polymers may be isolated and subsequently converted to lithium salt form by neutralization or ion exchange. Alternatively, the resulting sulfonated aromatic polymers are neutralized with LiOH prior to isolation. After neutralization or isolation, the lithium salt form of aromatic polymers are preferably purified by washing or dialysis to remove low molecular weight impurities and by products prior to use.

Polymers with low degrees of sulfonation might not be soluble in solvents that can be utilized in the preparation of composite membranes. On the other hand, highly sulfonated polymers might be highly soluble and will not require complete conversion to $Li^+$ form. For example, combinations of lithium ion with other monovalent ions might be utilized in the preparation of highly sulfonated polymers useful in the preparation of composite membranes. The mixed combinations may include mixtures of $Li^+$ ion with $Na^+$, $K^+$, $NH_4^+$ and other monovalent ions, including monovalent organic ions such as primary, secondary, tertiary, or quaternary amines. At least 25% of the ionic sites of the sulfonated aromatic polymer, however, are exchanged with lithium ions. Preferably more than 50 percent of ionic sites, most preferably more than 75 percent of ionic sites, are exchanged with $Li^+$ ions in mixed ion combinations. The higher is the degree of sulfonation the lower can be the concentration of $Li^+$ ions in the polymer, with the resultant polymer still soluble in solvents, such as alcohols, that are preferred for the preparation of composite membranes. At extremely high degrees of sulfonation of about 3 meq/g (the level may be lower for polymers with highly hydrophilic backbone), the sulfonated polymers in non-lithium ionic forms can become soluble in alcohols and thus suitable for formation of composite membranes. However, lithium-exchanged or partially lithium-exchanged sulfonated polymers, even at these exceptionally high degrees of sulfonation, frequently show improved solubility characteristics and provide composite membranes with improved separation characteristics.

Due to improved characteristics of the lithium-exchanged sulfonated aromatic polymers of this invention, composite membranes having enhanced selectivity, permeability and strength are produced easily and consistently through any of the known procedures, e.g., as shown in U.S. Pat. No. 4,467,001, incorporated herein by reference. For example, one procedure for forming composite membranes with the modified sulfonated aromatic polymers may include dissolving the polymer in a solvent to form a solution and applying the solution to deposit a finished dry coating up to about 10,000 Angstroms, preferably below 2,000 Angstroms, most preferably below 1,000 Angstroms on the exterior surface of a porous substrate. The resulting composite membrane is comprised of a thin sulfonated aromatic polymer layer or coating superimposed on a porous substrate. The thin layer or coating determines the separation characteristics of the composite membranes, with the porous substrate providing physical support for the layer or coating. In some instances, deposition or adhesion of the polymer on the surface of the porous substrate may be promoted by using surfactants and/or chemical treatments. The coating may further contain additives that improve flux and/or separation performance.

Additives that are particularly useful in the preparation of gas separation composite membranes with improved separation characteristics are low surface tension siloxanes, such as amine functional dimethylsiloxanes. The additives are essentially nonreactive with respect to sulfonated polymer in lithium salt form or other compounds of coating solution. The amount of additive is typically about 1 to 5 percent by weight of the total weight of the sulfonated aromatic polymer in lithium salt form. The low surface tension additives usually form immiscible blends with the sulfonated aromatic polymers in lithium salt forms of this invention. The low surface tension additives form an exterior low surface energy layer on top of the gas separation layer of sulfonated aromatic polymers in lithium salt form and protect the composite membrane during subsequent handling steps.

The sulfonated aromatic polymers in lithium salt forms are deposited on the preformed porous substrates from dilute solutions of volatile solvents, such as alcohols, ketones, or their mixtures with water. However, preferred solvents are low boiling alcohols, such as methanol, ethanol, or isopropyl alcohol with ethanol being particularly preferred. Typical concentrations of sulfonated aromatic polymers in lithium salt form in coating solutions range from 0.3 to 2 percent (weight by volume percent). The coating solution is deposited on to the porous substrate by means of an appropriate coating applicator or by simply passing the porous substrate through the coating solution. This deposition is normally followed by drying in a dryer oven. The temperature in the dryer oven is advantageously maintained in the range of 50° C. to 150° C.

If rigorous controls and care are not executed during the composite membrane manufacturing process, residual pores, pinholes, and other defects may occur that could impair final membrane performance. It is well known in the art that membrane post-treating techniques can be effectively utilized to seal these residual defects. The methods particularly useful for post-treating composite membranes are described in U.S. Pat. No. 4,767,422. If defects do occur in the separation layer of the composite membranes prepared from sulfonated aromatic polymers in lithium salt form, they can be effectively sealed by post-treating the membranes with low concentrations of polyelectrolytes dissolved in water, e.g., polyethylene amine, etc. or non-polyelectrolytes, e.g., siloxanes, particularly amino functional siloxanes, polyvinyltoluene, polyphosphazines, etc. dissolved in hydrocarbons. The optimal selection of post-treating material will depend on the specific nature of the fluid or the gas separation application.

Any porous substrate produced from inorganic or organic materials can be used to prepare the composite membranes. However, it is desirable to employ natural and synthetic polymers, including but not limited to polymer blends and alloys, thermoplastics and thermoset polymers, as the porous substrate. Typical polymers are substituted or unsubstituted polymers which are selected from polysulfones; poly(styrenes), including styrene-containing copolymers such as acrylonitrile-styrene copolymers, styrene-butadiene copolymers, and styrene-vinylbenzylhalide copolymers; polycarbonates; cellulosic polymers, such as cellulose acetate, cellulose-acetate-butyrate, cellulose propionate, methyl cellulose, etc.; polyamides and polyimides; polyethers; poly(arylene oxides) such as poly(phenylene oxide); polyurethanes; polyesters (including polyarylates), such as poly(ethylene terephthalate), poly(alkyl methacrylates), poly(alkyl acrylates), etc.; polysulfides; polymers from monomers having alpha-olefinic unsaturation other than mentioned above such as poly(ethylene), poly(propylene), poly(butene-1), poly(4-methyl pentene-1), polyvinyls, e.g., poly(vinyl chloride), poly(vinyl fluoride), poly(vinylidene chloride), poly(vinylidene fluoride), poly(vinyl esters) such as poly(vinyl acetate) and poly(vinyl propionate); polyphosphazines; etc. However, the preferred substrate materials are polysulfones. The porous substrate may be in flat sheet form, tubular form, hollow fiber form or any other configuration. Those skilled in the art are aware of the many methods for forming a porous substrate into different configurations. For instance, the porous hollow fibers can be produced by the well-known techniques described in the Journal of Applied Polymer Science, Vol. 23, 1509–1523, 1979, "Composite Hollow Fiber Membranes" by I. Cabasso, et al., and "Research and Development of NS-1 and Related Polysulfone Hollow Fibers for Reverse Osmosis Desalination of Seawater", PB 248,666 prepared for the Office of Water Research and Technology, Contract No. 14-30-3165, U.S. Department of the Interior, July 1975, incorporated herein by reference. As described in these references, the porous polysulfone hollow fibers can be prepared by dry/wet spinning method from a ternary solution of commercially available polysulfone in a solvent/nonsolvent mixture. The well-known tube-in-tube jet technique may be used for the spinning procedure with water at about room temperature, being the outside quench medium for the fibers. The quench medium in the center bore of the fiber preferably is air. Quenching is followed by extensive washing to remove pore forming materials. Following the wash, the hollow fibers are dried at elevated temperature and water is removed by passing the hollow fibers through a hot air drying oven. The porous hollow fibers most suitable for preparation of composite membranes possess pores below 500 Å in size, high levels of surface porosity, and narrow pore size distribution.

In another aspect, the present invention provides a composite membrane wherein the above described gas separation layer of sulfonated aromatic polymers in lithium salt form is formed on a first thin layer having a high gas permeability which is formed on the porous support. This porous support, which may be used herein, may be the same as described above. The first layer of exceptionally high gas permeability which may be interposed between the porous support and the above described gas separation layer is preferably made of a polymer having an oxygen permeation coefficient above $1 \times 10^{-8}$ cm$^3$·cm/cm$^2$·cmHg·sec. Preparation of such multilayered membranes is described in U.S. Pat. No. 4,602,922; European Patent Publication 0181850, and by K. A. Lundy and I. Cabasso in I&EC Research, 28, 742 (1989), "Analysis and Construction of Multilayer Composite Membranes for Separation of Gas Mixtures", incorporated herein by reference.

As stated above, the sulfonated aromatic polymers in lithium salt forms of the invention, are useful for preparing composite membranes. Such composite membranes can be used in a variety of fluid separations, especially for gas separations including separation of hydrogen from hydrogen containing gases, $O_2/N_2$ separations, $CO_2/CH_4$ separations, dehydration of water containing gas streams, and separation of helium from helium containing gases. A fluid or gas mixture at elevated pressure is brought into contact with the membrane whereby one or more components of the mixture is allowed to selectively permeate through the membrane with the rest of the mixture withdrawn as a nonpermeate.

The following examples serve to illustrate the invention. They are presented for illustrative purposes and are not intended to be limiting.

EXAMPLE 1

Four hundred grams of commercial-grade poly(phenylene oxide) polymer in fine powder form having an intrinsic viscosity of 0.49 dl/g available from General Electric Company were refluxed with about two liters of methyl ethyl ketone under mechanical agitation to form a slurry. The slurry was then filtered, while still hot, through a coarse sintered glass filter, thereby recovering a partially purified polymer. The recovered polymer was further washed with about one liter of fresh methyl ethyl ketone. The polymer was again refluxed, filtered and washed as indicated above to obtain a further purified polymer. The thus purified polymer was washed until the resulting filtrate was clear and colorless. The polymer was dried to a constant weight at about 80° C. in a vacuum oven. The polymer yield was about 78%. The recovered polymer was found to have an intrinsic viscosity of 0.59 dl/g while the combined filtrate (extracted portion) was found to have an intrinsic viscosity of about 0.34 dl/g. The number average molecular weight (Mn), weight average molecular weight (Mw) and molecular weight distribution of the recovered polymer were determined by using gel permeation chromatography. The results are summarized in Table I.

TABLE I

| Sample | Intrinsic Viscosity (dl/g) | Mn | Mw | Mw/Mn |
|---|---|---|---|---|
| Commercial poly(phenylene oxide) polymer | 0.49 | 15,000 | 58,000 | 3.9 |
| Purified poly(phenylene oxide) polymer of Example 1 | 0.59 | 40,000 | 71,000 | 1.8 |

Example 2

Four hundred grams of the purified poly(phenylene oxide) polymer were dissolved under nitrogen atmosphere in 2.25 liters of chloroform (pretreated with a calculated amount of chlorosulfonic acid to remove residual water present in chloroform) in a resin kettle equipped with high-speed stirrer. The solution was cooled to about −20° C. To this cooled solution, 77.8 ml of chlorosulfonic acid dissolved in 317 ml of chloroform were added in five-minute intervals. Throughout the addition, the temperature of the solution was kept at about −20° C. After the addition was complete, the temperature of the mixture was brought to 25° C. A rapid sulfonation took place with the formation of a smooth thin paste. The reaction mixture was stirred for one hour at 25° C. and then 2 liters of methanol were added to form a clear, yellow solution. This solution was subsequently mixed with about 101 grams of LiOH.H$_2$O and 102 grams of LiCl dissolved in about 800 ml of methanol/water mixture (methanol/water volume ratio was 60/40). The resulting mixture was concentrated to near dryness by rotary evaporation under vacuum. The residue dissolved in about 600 ml of methanol and diluted with about 1.8 liters of water. The mixture was dialyzed (10,000 MWCO molecular weight cutoff). The polymer was recovered from the dialyzed solution by rotary evaporation under vacuum and further dried at about 70° C. to a constant weight. The homogeneously sulfonated polymer in Li+ form had an intrinsic viscosity of about 0.59 dl/g measured in 0.05 M LiClO$_4$ dimethylformamide solution and an ion exchange capacity of about 2.14 milliequivalents/gram of dry polymer in H+ form.

The permeability coefficients and gas separation factors of the thus prepared polymers were determined using flat sheet films. These films were prepared by casting ethyl alcohol solution of the polymer on a glass plate followed by air drying. The air-dried films were stripped from the glass plates and dried in a vacuum oven at 70° C. for one week. The dried films that were 1 to 3 mils thick were placed in a permeation cell. The downstream side of the cell was evacuated to about $2.0 \times 10^{-2}$ mmHg and the feed gas introduced from the upstream side. The pressure of the permeate gas on the downstream side was measured using an MKS-Barathon pressure transducer. The permeability coefficient P was calculated from the steady-state gas permeation rate according to the equation:

$$P = C x V x L x \frac{\frac{dp}{dt}}{h}$$

The permeability coefficients are reported in Barter units $10^{-10}$ scm$^3$·cm/cm$^2$·cmHg·sec.

The gas separation factor is defined as the ratio of respective gas permeability coefficients. The oxygen permeation rate at 30° C. was determined to be 4.36 barrers with oxygen/nitrogen separation factors of

EXAMPLE 3

A composite hollow fiber membrane was prepared by coating porous polysulfone hollow fibers with a coating solution of the lithium form of sulfonated poly(phenylene oxide) polymer (SPPO-Li+ polymer) prepared essentially as described in Example 2. The coating solution of sulfonated poly(phenylene oxide) polymer was initially prepared by dissolving about 0.70 grams SPPO-Li+ polymer and about 0.007 grams of amine functional silicone fluid (Genesee Polymer Corp., GP-4) in 100 cc of Reagent Alcohol (Fisher Scientific, HPLC grade). The coating solution was then filtered through a 1.5 micron glass filter and placed within a coating vessel. Polysulfone hollow fibers, which were dried in a dryer oven, were coated by passing the fibers through the coating solution that was contained in the coating vessel at a speed of about 3.3 m/min and then passed through a dryer oven prior to being taken up on a winder. The coated polysulfone hollow fibers were used to build a hollow fiber separatory permeator that was tested for air separation utilizing compressed air at 1035 kPa and 23° C. The separation factor between oxygen and nitrogen was 7.0 and the permeation rate of oxygen was $8.2 \times 10^{-6}$ cm$^3$/cm$^2$·cmHg·sec.

EXAMPLE 4

Poly(phenylene oxide) purified as described in Example 1 was sulfonated according to the procedure of Example 2 except that the amount of chlorosulfonic acid was increased to 107.5 ml. to provide sulfonated poly(phenylene oxide) polymer in H+ form with the degree of substitution of 0.47. The sulfonated poly(phenylene oxide) in H+ form was dissolved in 2l of methyl alcohol and the solution was divided into five equal portions. The individual portions were neutralized with LiOH, NaOH, KOH, and equimolar mixtures of LiOH/NaOH and LiOH/KOH to form salified sulfonated poly(phenylene oxides) in Li+, Na+, K+, and mixed ion Li+/Na+ and Li+/K+ forms, respectively. All salified SPPO polymers were soluble in methanol. However, only Li+ form and Li$^{30}$/Na+ form were soluble in ethanol. The Na+, K+, and Li+/K+ forms became soluble in ethyl alcohol on the addition of a substantial amount of water. The Na+, K+ and K+/Li+ forms were soluble in 84/16, 72/28, and 89/11, ethanol/water mixtures (volume by volume), respectively. The example demonstrates improved solubility of lithium-based SPPO polymers.

Example 5

Mixed ion Li+/Na+ and Li+/K+ sulfonated poly(phenylene oxide) polymers were prepared and their solubility characteristics in ethanol were determined. The mixed ion polymers were prepared by mixing lithium form with sodium or potassium forms. The sulfonated poly(phenylene oxides) used in this example had an ion exchange capacity of 2.99 meq/g of dry polymer in H+ form. The solubility characteristics of different ionic forms were determined in 2 percent weight by volume solutions. The results are summarized in the following table. The mixed ion polymers with high Na+ and K+ concentrations were not soluble in ethanol but became soluble on the addition of water. The amount of water required increased with increase in the concentration of Na+ or K+ ions. The minimum concentration of water in ethanol required to dissolve mixed ion polymers is further listed in Table II.

TABLE II

| | Ion Ratios (Wt %) | Solubility in EtOH | EtOH/ H$_2$O ml ml |
|---|---|---|---|
| SPPO-Na/Li | 25/75 | soluble | 100.0/ 0.0 |
| | 50/50 | soluble | 100.0/ 0.0 |
| | 60/40 | not soluble | 96.6/ 3.4 |
| | 70/30 | not soluble | 94.3/ 5.7 |
| | 80/20 | not soluble | 90.9/ 9.1 |
| SPPO-K/Li | 10/90 | soluble | 100.0/ 0.0 |
| | 20/80 | not soluble | 95.2/ 4.8 |
| | 30/70 | not soluble | 89.3/ 10.7 |
| | 40/60 | not soluble | 87.7/ 12.3 |
| | 50/50 | not soluble | 84.0/ 16.0 |

EXAMPLE 6

Sulfonated hexafluoro bisphenol-A polysulfone (F6 SPS-Li) in lithium salt form was prepared from sulfonated hexafluoro bisphenol-A polysulfone (F6-SPS). The sulfonated F6-SPS polysulfone was prepared essentially as described in U.S. Pat. No. 4,971,695, incorporated herein by reference. About 150 grams of F6-SPS polymer in H+ form (degree of substitution 0.87 and ion exchange capacity of 1.42 meq/g of dry polymer in H+ form) were dissolved in about 3 liters of reagent alcohol to form a solution. To this solution was added an aqueous solution containing lithium hydroxide and lithium chloride, which was prepared by dissolving about 9.2 grams (0.22 moles) of LiOH.H$_2$O and about 18.7 g (0.44 moles) of LiCl in 750 ml of water. After the resulting mixture was vigorously stirred, an additional 5 ml of 0.2 M LiOH was added to obtain a pH of about 9. The mixture was stirred for 3 days at ambient temperature and the pH of the solution was adjusted to about 9 by the addition of 0.2 M LiOH needed. The resulting slurry was filtered and dialyzed to remove excess base and salts (membrane molecular weight cutoff 10,000), and dried first by rotary evaporation followed by drying in a vacuum oven for 2 days at about 70° C.

Subsequently, about 1.75 grams of the dry F6-SPS Li and about 0.05 grams of an amine functional silicone (GP-4, Genesee Polymer Corp.) were dissolved in about 100 cc of reagent alcohol (Fischer Scientific, HPLC grade) to form a coating solution. The coating solution was then filtered through a 1.0 micron polypropylene filter and placed within a coating solution applicator. The composite membrane was prepared by passing the dry polysulfone hollow fibers through a coating solution at a speed of about 7 m/min, followed by drying in a dryer oven at temperatures ranging from about 80 to about 135° C. with a residence time of about 24 seconds.

A permeator was constructed from the composite membranes coated as described above. The preparation of the permeator and its subsequent operation to dehydrate water-saturated compressed air feed are described in U.S. Pat. No. 4,981,498, incorporated herein by reference.

The permeator was utilized to dry water-saturated compressed air streams at 1035 KPa and 23° C. at a purge ratio of 20 percent and feed flow rate of 0.0904 scc/sec/cm$^2$ utilizing dry product purge. The water vapor permeability was $3200 \times 10^{-6}$ cm$^3$/cm$^2$·cmHg·sec. In a separate air separation experiment, the oxygen permeability for the permeator was found to be $0.31 \times 10^{-6}$ cm$^3$/cm$^2$·cmHg·sec with an oxygen/nitrogen separation factor of about 7.1. The permeator thus exhibited an apparent H$_2$O/ N$_2$ separation factor of about 73,000.

Although the invention has been described in detail with reference to certain specific embodiments, those skilled in the art will recognize that there are other embodiments within the spirit and scope of the claims.

What is claimed is:

1. A process for separating at least one gas component from a gas mixture, said process comprising: bringing said gas mixture into contact with a composite membrane at a pressure sufficient to permeate said at least one gas component from said gas mixture, said composite membrane comprised of at least one sulfonated aromatic polymer in lithium salt form separation layer deposited on a porous support, wherein said at least one sulfonated aromatic polymer in lithium salt form comprises sulfonic acid groups attached to aromatic rings which are part of the polymeric backbone, with at least 25 percent of said sulfonic acid groups containing lithium ion as a counterion and wherein said composite fluid separation membrane is produced by a process comprising:
   (a) providing sulfonated aromatic polymer in lithium salt form with sulfonic acid groups attached to aromatic rings which are part of the polymeric backbone, with at least 25 percent of said sulfonic acid groups containing lithium ion as a counterion;
   (b) dissolving said sulfonated aromatic polymer in lithium salt form in solvent to form a solution;
   (c) coating or applying said resulting solution on the surface of a porous substrate; and
   (d) drying or coagulating the coated substrate.

2. A composite fluid separation membrane capable of separating at least one fluid component from a fluid mixture, said composite membrane comprised of at least one separating layer of at least one sulfonated aromatic polymer in lithium salt form on a porous substrate, wherein said at least one sulfonated aromatic polymer in lithium salt form comprises sulfonic acid groups attached to aromatic rings which are part of the polymeric backbone, with at least 25 percent of said sulfonic acid groups containing lithium as a counterion and wherein said composite fluid separation membrane is produced by a process comprising:
   (a) providing sulfonated aromatic polymer in lithium salt form with sulfonic acid groups attached to aromatic rings which are part of the polymeric backbone, with at least 25 percent of said sulfonic acid groups containing lithium ion as a counterion;
   (b) dissolving said sulfonated aromatic polymer in lithium salt form in solvent to form a solution;
   (c) coating or applying said resulting solution on the surface of a porous substrate; and
   (d) drying or coagulating the coated substrate.

3. The composite fluid separation membrane according to claim 2, wherein said at least one sulfonated aromatic polymer in lithium salt form comprises sulfonic acid groups attached to aromatic rings which are part of the polymeric backbone, with at least 50 percent of said sulfonic acid groups containing lithium ion as a counterion.

4. The composite fluid separation membrane according to claim 2, wherein said at least one sulfonated aromatic polymer in lithium salt form comprises sulfonic acid groups attached to aromatic rings which are part of the polymeric backbone, with at least 75 percent of said sulfonic acid groups containing lithium ion as a counterion.

5. The composite membrane according to claim 2, wherein said sulfonated aromatic polymer in lithium salt form is sulfonated 2,6-dimethyl-1,4-phenylene ether polymer in lithium salt form defined as having a chemical structure:

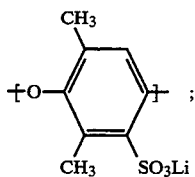

sulfonated bisphenol-A polysulfone in lithium salt form defined as having a chemical structure:

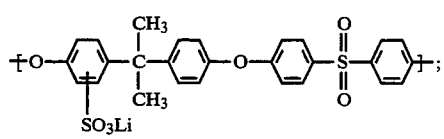

sulfonated hexafluoro bisphenol-A polysulfone in lithium salt form defined as having a chemical structure:

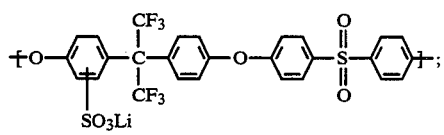

sulfonated polyether sulfone in lithium salt form defined as having a chemical structure:

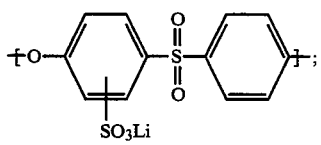

sulfonated biphenylether-based polysulfone in lithium salt form defined as having a chemical structure:

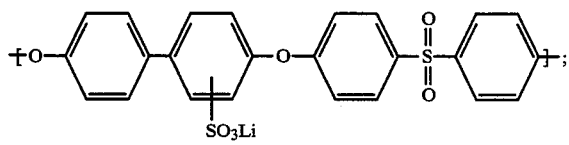

sulfonated polyarylether sulfone in lithium salt form defined as having a chemical structure:

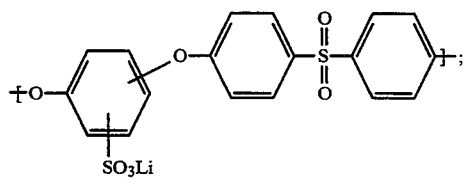

sulfonated poly(etheretherketone) in lithium salt form defined as having a chemical structure:

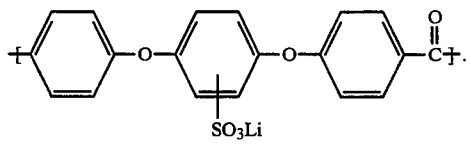

6. The composite membrane according to claim 2, wherein said porous support is porous polysulfone hollow fibers.

7. A process for producing a composite membrane comprised of at least one separation layer of at least one sulfonated aromatic polymer in lithium salt form on a porous substrate, said process comprising:
  (a) providing sulfonated aromatic polymer in lithium salt form with sulfonic acid groups attached to aromatic rings which are part of the polymeric backbone, with at least 25 percent of said sulfonic acid groups containing lithium ion as a counterion;
  (b) dissolving said sulfonated aromatic polymer in lithium salt form in solvent to form a solution;
  (c) filtering said solution to remove any undissolved materials;
  (d) coating or applying said resulting solution on the surface of a porous substrate; and
  (e) drying or coagulating the coated substrate.

8. The process for producing a composite membrane according to claim 7, further comprising adding at least one additive having lower surface tension characteristics than the sulfonated aromatic polymer in lithium salt form to said solvent.

9. The process for producing a composite membrane according to claim 8, wherein said additive is an amine functional silicon.

10. The process for producing a composite membrane according to claim 7, wherein said sulfonated aromatic polymer in lithium salt form comprises sulfonic acid groups attached to aromatic rings which are part of the polymeric backbone, with at least 50 percent of said sulfonic acid groups containing lithium ion as a counterion.

11. The process for producing a composite membrane according to claim 10, wherein said sulfonated aromatic polymers in lithium salt form comprises sulfonic acid groups attached to aromatic rings which are part of the polymeric backbone, with at least 75 percent of said sulfonic acid groups containing lithium ion as a counterion.

12. The process for producing a composite membrane according to claim 7, wherein said solvent is selected from the group consisting of alcohols, ketones and their mixtures with water.

13. The process for producing a composite membrane according to claim 7, wherein said sulfonated aromatic polymer in lithium salt form is sulfonated 2,6-dimethyl-1,4-phenylene ether polymer in lithium salt form defined as having a chemical structure:

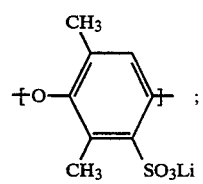

sulfonated bisphenol-A polysulfone in lithium salt form defined as having a chemical structure:

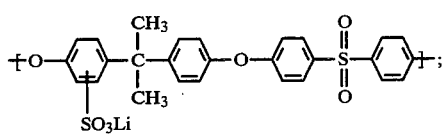

sulfonated hexafluoro bisphenol-A polysulfone in lithium salt form defined as having a chemical structure:

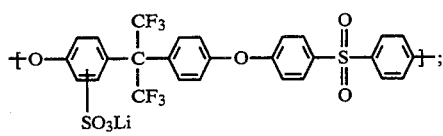

sulfonated polyether sulfone in lithium salt form defined as having a chemical structure:

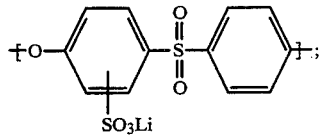

sulfonated biphenylether-based polysulfone in lithium salt form defined as having a chemical structure:

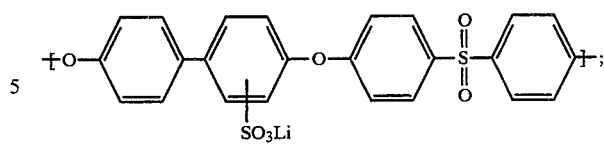

sulfonated polyarylether sulfone in lithium salt form defined as having a chemical structure:

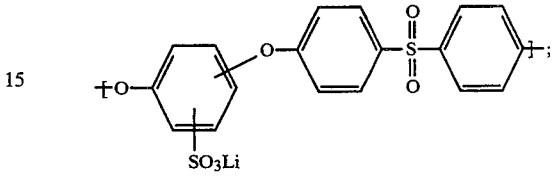

sulfonated poly (etheretherketone) in lithium salt form defined as having a chemical structure:

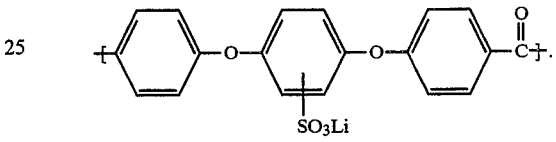

14. The process for producing a composite membrane according to claim 7, further comprising providing a thin polymeric layer on said porous support prior to coating or applying said solution in step (d).

* * * * *